United States Patent
Knezevic et al.

(10) Patent No.: US 11,487,779 B2
(45) Date of Patent: Nov. 1, 2022

(54) VIRTUAL FUNCTION AS QUERY OPERATOR

(71) Applicants: Sinisa Knezevic, Sunnyvale, CA (US); Petya Nikolova, Sunnyvale, CA (US); Shasha Luo, Sunnyvale, CA (US); Nitesh Maheshwari, Dublin, CA (US); Shahul Hameed P, Sunnyvale, CA (US); Haiyan Du, Dublin, CA (US); George Quaye, San Leandro, CA (US)

(72) Inventors: Sinisa Knezevic, Sunnyvale, CA (US); Petya Nikolova, Sunnyvale, CA (US); Shasha Luo, Sunnyvale, CA (US); Nitesh Maheshwari, Dublin, CA (US); Shahul Hameed P, Sunnyvale, CA (US); Haiyan Du, Dublin, CA (US); George Quaye, San Leandro, CA (US)

(73) Assignee: SAP SE, Walldorf (DE)

( * ) Notice: Subject to any disclaimer, the term of this patent is extended or adjusted under 35 U.S.C. 154(b) by 1342 days.

(21) Appl. No.: 14/533,277

(22) Filed: Nov. 5, 2014

(65) Prior Publication Data
US 2016/0125056 A1    May 5, 2016

(51) Int. Cl.
G06F 16/00 (2019.01)
G06F 16/25 (2019.01)
G06F 16/2455 (2019.01)

(52) U.S. Cl.
CPC ...... *G06F 16/258* (2019.01); *G06F 16/24568* (2019.01)

(58) Field of Classification Search
CPC ............. G06F 17/30569; G06F 16/258; G06F 16/24568; G06F 16/30; G06F 16/434; G06F 16/951

USPC ......................................................... 707/722
See application file for complete search history.

(56) References Cited

U.S. PATENT DOCUMENTS

| | | | |
|---|---|---|---|
| 8,713,038 B2 | 4/2014 | Cohen et al. | |
| 8,794,674 B2 | 7/2014 | Ravi et al. | |
| 8,819,335 B1 | 8/2014 | Salessi et al. | |
| 10,133,800 B2* | 11/2018 | Chaiken | G06F 16/258 |
| 2004/0078371 A1* | 4/2004 | Worrall | G06F 16/954 |
| 2004/0225629 A1* | 11/2004 | Eder | G06N 5/022 |
| | | | 706/46 |
| 2011/0047172 A1 | 2/2011 | Chen et al. | |

(Continued)

FOREIGN PATENT DOCUMENTS

CN    103761080 A    4/2014

OTHER PUBLICATIONS

Jaedicke, Michael. New Concepts for Parallel Object-Relational Query Processing. 2001, Springer, Berlin, Heidelberg (Year: 2001).*

*Primary Examiner* — Vincent F Boccio
(74) *Attorney, Agent, or Firm* — Buckley, Maschoff & Talwalkar LLC

(57) ABSTRACT

A system includes definition of a remote data source, definition of a virtual function specifying executable job code, a return data format and a data location in the remote data source, reception of a structured language query including the virtual function as a data source, and, in response to the received query, instruction of the remote data source to execute the job code based on data in the data location and return data in the return data format.

11 Claims, 6 Drawing Sheets

(56) References Cited

U.S. PATENT DOCUMENTS

| | | | |
|---|---|---|---|
| 2011/0302583 A1* | 12/2011 | Abadi | G06F 16/2471 |
| | | | 718/102 |
| 2012/0239612 A1* | 9/2012 | George | G06F 17/30563 |
| | | | 707/602 |
| 2012/0324459 A1 | 12/2012 | Agarwal et al. | |
| 2013/0282650 A1 | 10/2013 | Zhang et al. | |
| 2014/0032528 A1 | 1/2014 | Mandre et al. | |
| 2014/0082002 A1* | 3/2014 | Kim | G06F 16/434 |
| | | | 707/755 |
| 2014/0156806 A1* | 6/2014 | Karpistsenko | G06F 16/25 |
| | | | 709/219 |
| 2014/0215178 A1 | 7/2014 | Li et al. | |
| 2014/0215477 A1 | 7/2014 | Chen et al. | |
| 2014/0351233 A1* | 11/2014 | Crupi | G06F 16/24568 |
| | | | 707/706 |
| 2015/0074151 A1* | 3/2015 | Chaiken | G06F 16/258 |
| | | | 707/803 |
| 2015/0088924 A1* | 3/2015 | Abadi | G06F 16/90335 |
| | | | 707/769 |

* cited by examiner

VIRTUAL FUNCTION AS QUERY OPERATOR

BACKGROUND

Conventional database management systems provide stored data to client applications upon request. The data may be stored in local disks and/or local volatile memory (e.g., Random Access Memory) in order to enable fast access thereto. Some database management systems are also capable of pulling data from remote (and typically large-scale) data sources and providing this data to client applications. For example, a remote large-scale data source may support structured queries received from a database management system. This support does not include, among other shortcomings, retrieval of unstructured binary data or ad-hoc analysis of unstructured binary data.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
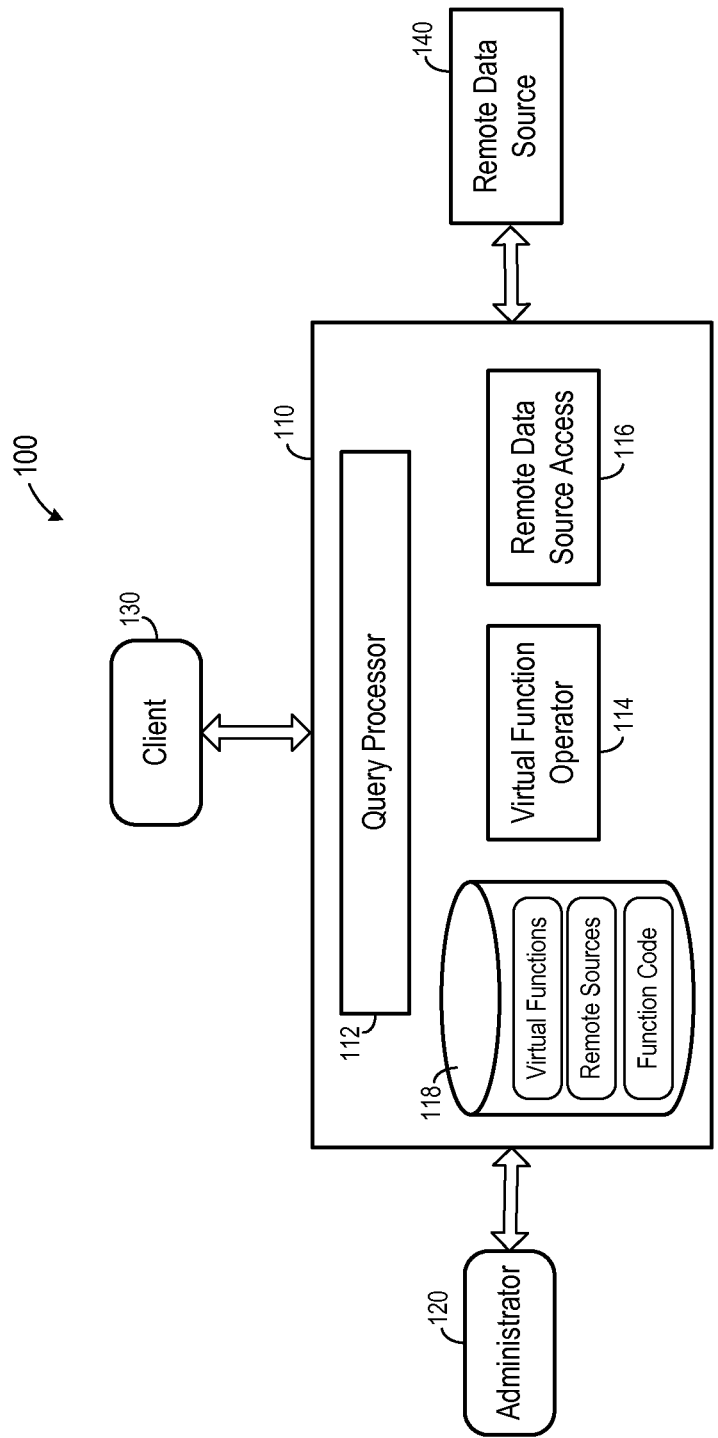
FIG. 1 is a block diagram of a system according to some embodiments.

FIG. 1 is a block diagram of system 100 according to some embodiments. System 100 includes data server 110, administrator 120, client 130, and remote data source 140. Generally, data server 110 receives queries from client 130 and provides results to client 130 based on local data (not shown) and/or data of remote data source 140. The data to be retrieved from remote data source 140 may be stored therein in an unstructured format and retrieved in a structured format. In some embodiments, remote data source 140 provides a job execution engine, and, in response to the query, one or more jobs are executed thereby and resulting data is returned in a structured format.

Data server 110 may store local data in Random Access Memory (e.g., cache memory for storing recently-used data) and one or more fixed disks (e.g., persistent memory for storing their respective portions of the full database). Alternatively, data server 110 may implement an "in-memory" database, in which the full database is stored in volatile (e.g., non-disk-based) memory (e.g., Random Access Memory).

In some embodiments, the data of data server 110 may comprise one or more of conventional tabular data, row-based data, column-based data, and object-based data. Data server 110 may support multi-tenancy to separately support multiple unrelated clients by providing multiple logical database systems which are programmatically isolated from one another. Moreover, the data of data server 110 may be indexed and/or selectively replicated in an index to allow fast searching and retrieval thereof.

Client 130 may comprise one or more devices executing program code of a software application for presenting user interfaces to allow interaction with data server 110. For example, a user may manipulate such user interfaces to request particular data (e.g., for populating a spreadsheet, a graph, etc.). In response, client 130 executes program code of a software application to generate a query (e.g., a structured-query language (SQL) query) identifying the requested data, and to transmit the query to data server 110.

Presentation of a user interface may comprise any degree or type of rendering. For example, client 130 may execute a Web Browser to receive a Web page (e.g., in HTML format) from data server 110, and may render and present the Web page according to known protocols. Client 130 may also or alternatively present user interfaces by executing a stand-alone executable file (e.g., an .exe file) or code (e.g., a JAVA applet) within a virtual machine. System 100 may include any number of clients 130 of one or more types according to some embodiments.

Remote data source 140 may comprise any data source or sources that are or become known, including but not limited to a structured-query language (SQL) relational database management system. Remote data source 140 may comprise a relational database, a multi-dimensional database, an eXtendable Markup Language (XML) document, or any other data storage system storing structured and/or unstructured data. The data remote data source 140 may be distributed among several relational databases, dimensional databases, and/or other data sources. Embodiments are not limited to any number or types of data sources.

According to some embodiments, remote data source 140 may comprise a distributed file system. For example, remote data source 140 may comprise a distributed file system for use by data-intensive distributed applications, such as that provided by Apache Hadoop. In this regard, remote data source 140 may support MapReduce, a software framework that allows developers to write programs that process massive amounts of unstructured data in parallel across a distributed cluster of processors or stand-alone computers. The framework is divided into two parts: Map, a function that parcels out work to different nodes in the distributed cluster, and Reduce, another function that collates the work and resolves the results into a single value. Remote data source 140 may comprise a Yet Another Resource Negotiator (YARN) engine, compatible with the MapReduce API and capable of executing MapReduce jobs and jobs developed in other languages.

According to some embodiments, elements 112 through 118 operate to provide data of remote data source 140 to client 130 in response to a structured query. Query processor 112 may receive such a query, specifying a virtual function as a query operator or, more specifically, as a data source from which to pull the query results. As will be described in detail below, such a virtual function is defined in metadata 118 by administrator 120.

Administrator 120 may comprise a software application for administering data server 110. Administrator 120 may be operated to specify operational parameters of data server 110, to maintain operation of data server 120, to define security authorizations, and/or to generate metadata of repository 118. As shown, repository 118 may include metadata describing virtual functions and remote sources, as well as executable function code. The data stored in repository 118 is not limited thereto.

Virtual function operator 114 is a runtime instantiation of a virtual function described in repository 118, and may be "executed" as described herein. Remote data source access 116 retrieves data from remote data source 140 and/or initiates job execution within remote data source 140 as defined by the virtual function.

Figure 2:
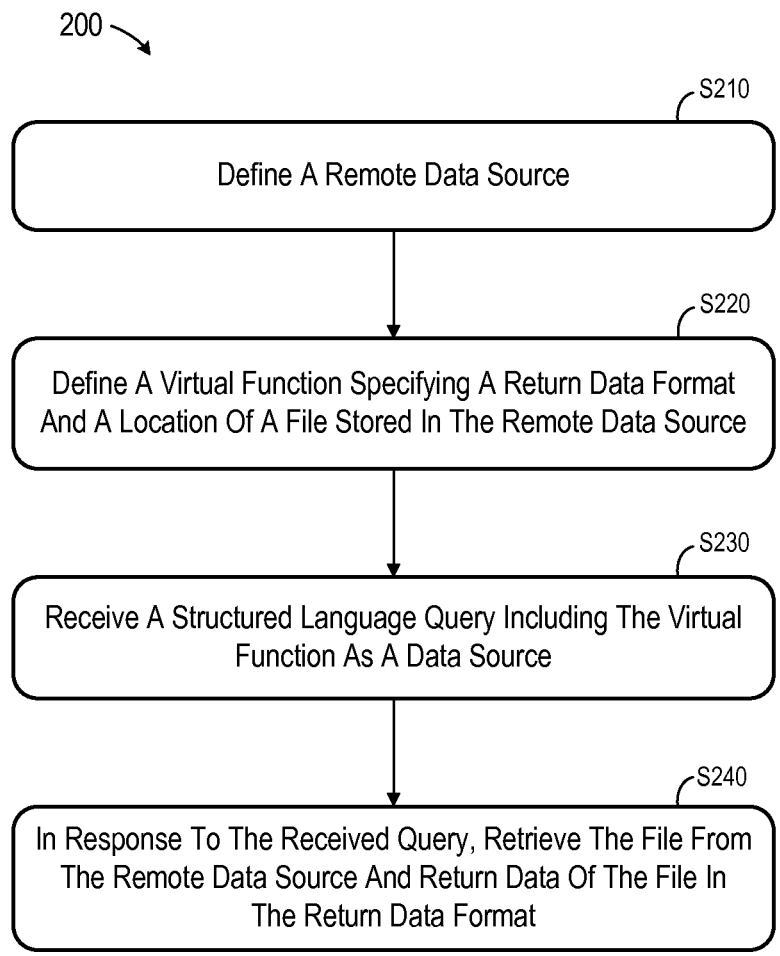
FIG. 2 is a flow diagram of a process according to some embodiments.

FIG. 2 comprises a flow diagram of process 200 according to some embodiments. Process 200 may be executed to retrieve data from an unstructured file in response to a structured query of a virtual function, and to retrieve the data in a structured format specified by the virtual function.

In some embodiments, various hardware elements of data server 110 (e.g., one or more processors) execute program code to perform process 200. Process 200 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, a remote data source is defined at S210. According to some embodiments, a developer operates administrator 120 to create statements defining a remote data source, and stores the statements in conjunction with a container of repository 118. In one example, the following statements may define a remote data source:
CREATE REMOTE SOURCE DEMO_SRC ADAPTER "hadoop" CONFIGURATION
'webhdfs_url=http://lbpa140:50071/;webhcat_url=http://lbpa143:50110'
WITH CREDENTIAL TYPE 'PASSWORD' USING 'user=hduser;password=hduser'

Next, at S220, a virtual function is defined. The virtual function specifies a return data format and a location of a file stored in the remote data source. The virtual function is stored in repository 118. According to some embodiments, the syntax of a virtual function definition is as follows:
CREATE VIRTUAL FUNCTION tpch_lineitem_udf( )
    RETURNS TABLE ("l_orderkey" INTEGER, "lpartkey" INTEGER,
      "l_suppkey" INTEGER,
      "l_linenumber" INTEGER,
      "l_quantity" REAL,
      "l_extendedprice" REAL,
      "l_discount" REAL,
      "l_tax" REAL,
      "l_returnflag" VARCHAR(255),
      "l_linestatus" VARCHAR(255),
      "l_shipdate" VARCHAR(255),
      "l_commitdate" VARCHAR(255),
      "l_receiptdate" VARCHAR(255),
      "l_shipinstruct" VARCHAR(255),
      "l_shipmode" VARCHAR(255),
      "l_comment" VARCHAR(255))
    CONFIGURATION 'datetime_format=yyyy-MM-dd HH:mm:ss; date_format=yyyy-MM-dd HH:mm:ss; enable_remote_cache=true; time_format=HH:mm:ss; hdfs_field_delimiter=|; hdfs_location=/user/hive/warehouse/tpch.db/lineitem' AT DEMO_SRC In the above example, the sixteen variables beginning with "l_" are columns of the return table TABLE, and the file location is "/user/hive/warehouse/tpch.db/lineitem".

The thusly-defined and stored remote data source and virtual function may then be activated for use during runtime. At runtime, a structured language query (e.g., a Structured Query Language (SQL) query) is received at S230. The query includes the virtual function as an operator. For example:
SELECT*FROM tpch_lineitem_udf( )

As shown, the virtual function tpch_lineitem_udf( ) is a data source of the query. At S240, and in response to the received query, the file is retrieved from the remote data source and data of the file is returned in the return data format specified by the virtual function. This retrieval may be performed by remote data source access 116 based on the metadata defining the virtual function and the remote source.

As will be described below, remote data source access 116 may utilize one or more interfaces provided by remote data source 140 to retrieve the file from remote data source 140. Remote data source 140 may format data of the retrieved file based on the defined return data format and return the thusly-formatted data to remote data source access 116.

Figure 3:
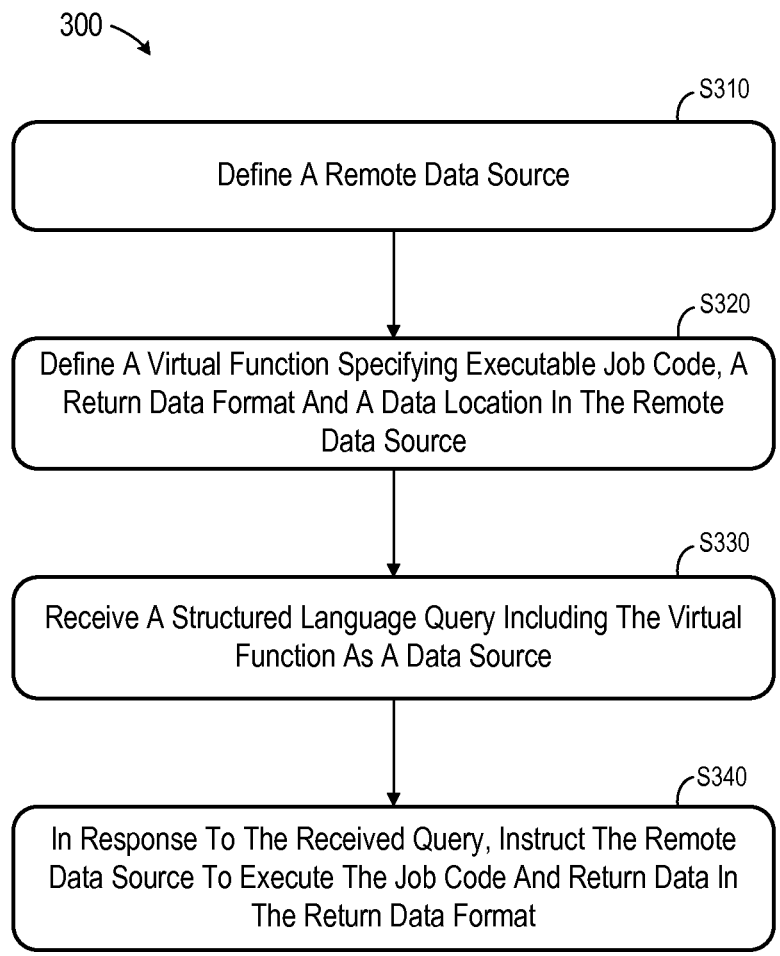
FIG. 3 is a flow diagram of a process according to some embodiments.

FIG. 3 is a flow diagram of process 300 according to some embodiments. Process 300 may be executed to initiate execution of a job by a remote data source and to return results of the job in a specified structured format.

A remote data source is defined at S310 as described above with respect to S210. In the present example, the following statements are developed to define a remote data source at S310:
CREATE REMOTE SOURCE "hadoop.sp09.demos::DEMO_A" ADAPTER hadoop CONFIGURATION
'webhdfs_url=http://lbpa140:50071/;webhcat_url=http://lbpa143:50110'
WITH CREDENTIAL TYPE 'PASSWORD' USING 'user=hduser;password=hduser'

A virtual function is then defined at S320. The virtual function specifies a return data format, a data location, and executable job code. According to some embodiments, the syntax of a virtual function definition is as follows:
CREATE VIRTUAL FUNCTION "SYSTEM"."hadoop.sp09.demos::DEMO_A"( )
    RETURNS TABLE (WORD NVARCHAR(60), COUNT INTEGER)
    PACKAGE "SYSTEM".Demo123"
    CONFIGURATION 'enable_caching=true; mapred jobchain=[{"mapred_input":/apps/hive/warehouse/dflo.db/region/", "mapred_mapper":"com.sap.hana.hadoop.samples.WordMapper","mapred_reducer":"com.sap.hana.hadoop.samples.WordReducer"}]'
    AT "hadoop.sp09.demos::DEMO_A"

In the above example, the columns of the return table TABLE are WORD and COUNT, the data location in the remote data source is "/apps/hive/warehouse/dflo.db/region/", and the executable job code includes the classes "samples.WordMapper" (i.e., a "Map" function) and "samples.WordReducer" (i.e., a "Reduce" function) located within the package "Demo123". The executable job code may comprise Java or any other suitable language. The virtual function and the executable job code are stored in repository 118 in association with the definition of the remote data source, for example in a common container object. The remote data source and virtual function may then be activated for use during runtime.

A structured language query (e.g., a Structured Query Language (SQL) query) is received at runtime at S330. The query may be received from client 130 or from administrator 120 in a testing mode. The received query includes the defined virtual function as an operator. For example: SELECT*FROM "hadoop.sp09.demos::DEMO_A"( )

As shown, the virtual function "hadoop.sp09.demos:: DEMO_A"( ) is a data source of the query. At S340, and in response to the received query, the remote data source is instructed to execute the job code and return data in the specified return data format.

Remote data source access 116 may issue the instruction at S340 based on the metadata defining the virtual function and the remote source. For example, and as will be described below, the instruction may utilize and provided by remote data source 140 for passing executable job code and for retrieving associated results. In some embodiments, the data may be first retrieved from the specified data location of the remote data source and then passed to the remote data source along with the executable job code.

Figure 4:
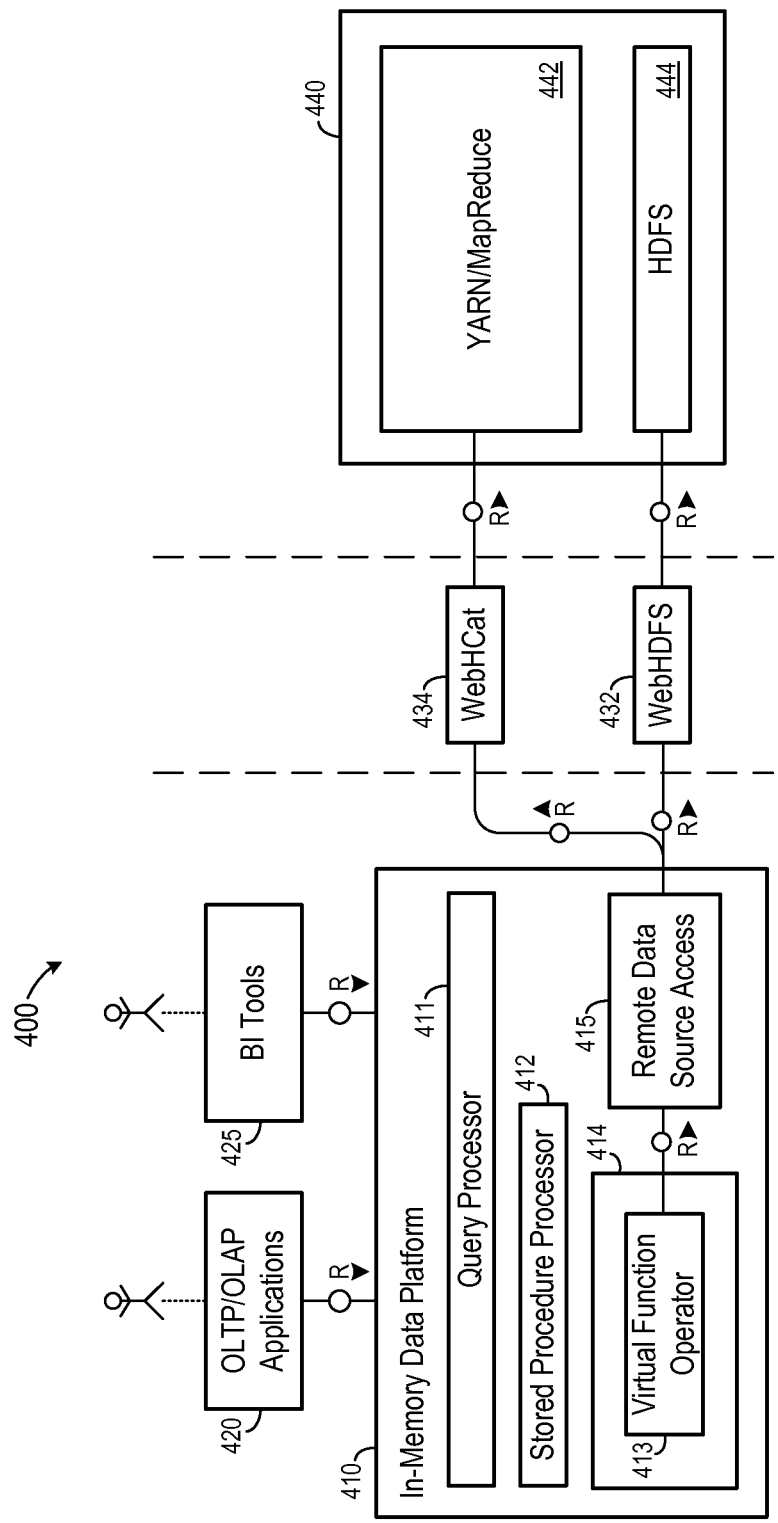
FIG. 4 is a block diagram of a system according to some embodiments.

FIG. 4 is a detailed block diagram of system 400 according to some embodiments. System 400 may comprise an implementation of system 100 and, as such, the elements of system 400 may execute processes 200 and/or 300 according to some embodiments.

In-memory data platform 410 includes query processor 411 and stored procedure processor 412. Stored procedure processor 412 is a façade for executing user-defined functions and procedures. Stored procedure processor 412 compiles the procedure and invokes appropriate operators, such as virtual function operator 413 within calculation engine 414. Calculation engine 414 is the execution engine for all procedures.

WebHDFS 432 is a Representational State Transfer (REST) Application Programming Interface (API) supporting filesystem operations on Hadoop Distributed File System (HDFS) 444. Remote data source access 415 may use WebHDFS 432 to retrieve files from HDFS 444 at S240 and/or S340 as described above.

WebHCat 434 is a REST API for HCatalog, a table and storage management layer for Hadoop. WebHCat 434 includes commands for creating and queueing a (streaming or non-streaming) MapReduce job. Accordingly, remote data source access 415 may use WebHCat 434 to instruct execution of MapReduce jobs at S340 as described above.

Remote data source 440 comprises a Hadoop data source as described above. YARN/MapReduce component 442 executes MapReduce jobs and HDFS 444 comprises distributed file storage. Remote data source 440 may comprise any type of data source, including but not limited to a conventional database management system.

Figure 5:
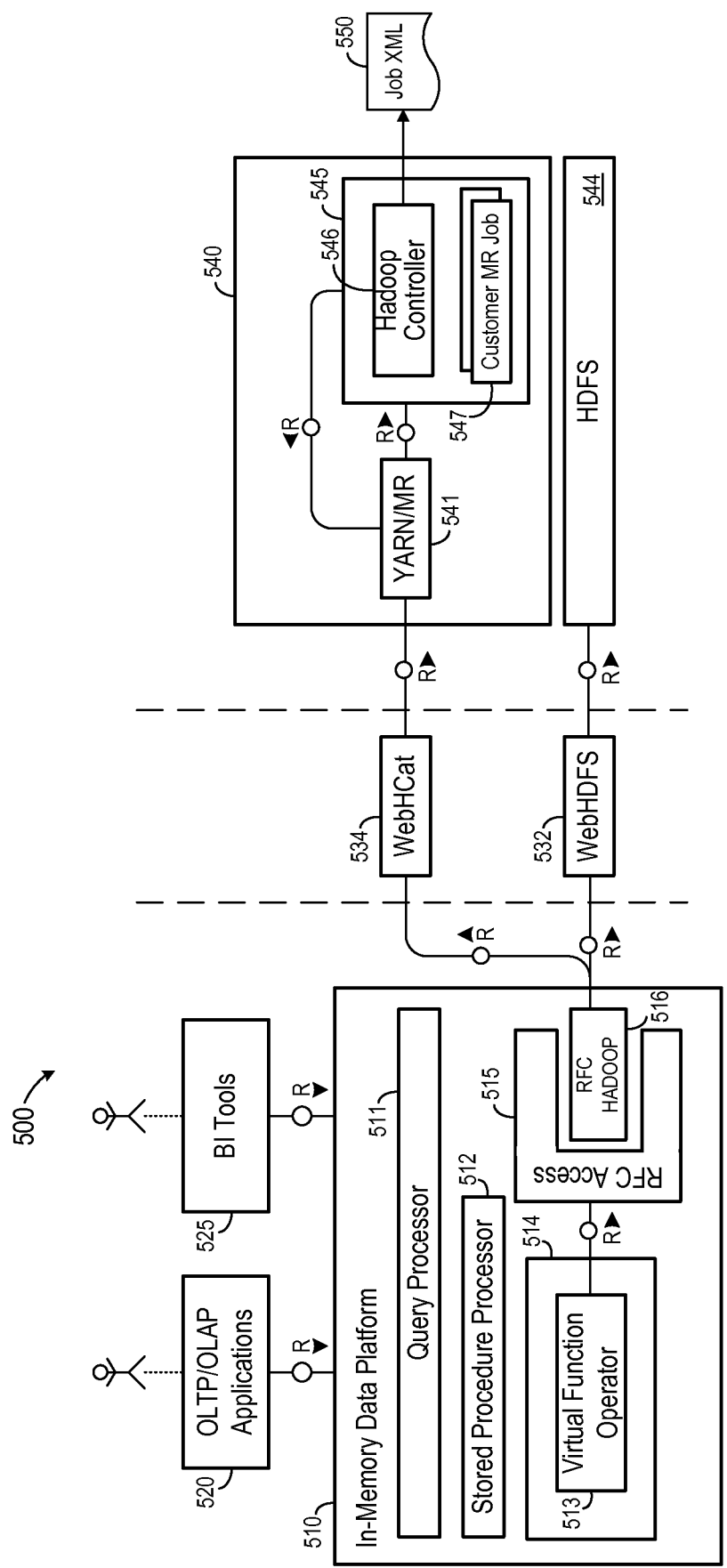
FIG. 5 is a block diagram of a system according to some embodiments.

FIG. 5 is a block diagram of system 500 according to some embodiments. System 500 is implemented similarly to system 400 of FIG. 4. In contrast, however, system 500 includes RFC access 515 and RFC Hadoop 516. RFC access 515 is a generic interface to remote data sources for execution of virtual functions as described herein, and RFC Hadoop 516 is a Hadoop-specific interface between RFC access 515 and a Hadoop-type remote data source. RFC access 515 therefore supports the use of non-Hadoop data sources, provided an appropriate interface between RFC access 515 and the remote data source exists.

System 500 also includes customer job engine 545. Hadoop controller 546 of engine 545 acts as a driver class to coordinate execution of jobs 547 received from data server 510. Specifically, in some embodiments, Hadoop controller 546 validates a job XML file 550 for completeness of type information, and creates job configurations according to the XML file 550. Hadoop controller 546 submits the jobs to YARN/MR 541 in sequence and checks the job outcome. The last job in the sequence is reconfigured with appropriate output formats and, in some embodiments, the data is written into compressed columnar format and split into manageable chunks.

The following is an example of a virtual function defined at S320 which specifies a sequence of jobs to be controlled by Hadoop controller 546:
CREATE VIRTUAL FUNCTION image_info( )
   RETURNS TABLE ("type" varchar(255), "width" INTEGER, "height" INTEGER)
   PACKAGE SYSTEM."flickr"
   CONFIGURATION 'enable_remote_cache=true;mapred jobchain=[
   {"mapred_input":"/data/inputs/images/input","mapred_mapper":"com.sap.hana.hadoop.samples.FlickerSearch$Mapper"},
   {"mapred_input":"result{0}","mapred_input_format": "com.sap.hana.hadoop.samples.DownloaderInputFormat", "mapred_mapper":"com.sap.hana.hadoop.samples.FlickrDownloader$Mapper","mapred_reducer":"com.sap.hana.hadoop.samples.FlickrDownloader$Reducer"},
   {"mapred_input":"result{1}","mapred_input_format": "hipi.imagebundle.mapreduce.ImageBundleInputFormat", "mapred_mapper":"com.sap.hana.hadoop.samples.ImageAnalyzer$Mapper"}
   ]' AT DEMO_SRC The jobs may be initiated upon reception of a query such as SELECT*FROM image_info( ). According to this example, jobchain defines a sequence of job execution with cascaded data feed. The data feed can be selectively chosen by specifying the appropriate job input, e.g.: result{<step number>}.

This example includes three jobs each doing a specific task. The first job searches Flickr for user-uploaded photos matching given criteria and creates a text file containing all the resulting image locations. The job output is a text file containing all a Uniform Resource Locator (URL) of each image location.

The second job fetches all these images in parallel and stores them into HDFS 444. The output is packaged binary content of the downloaded images. Next, the third job parses each downloaded image, analyzes the image properties, and produces a structured data set consisting of structured attributes of the images. Data platform 410 consumes the results from the last job when an appropriate query is fired.

Figure 6:
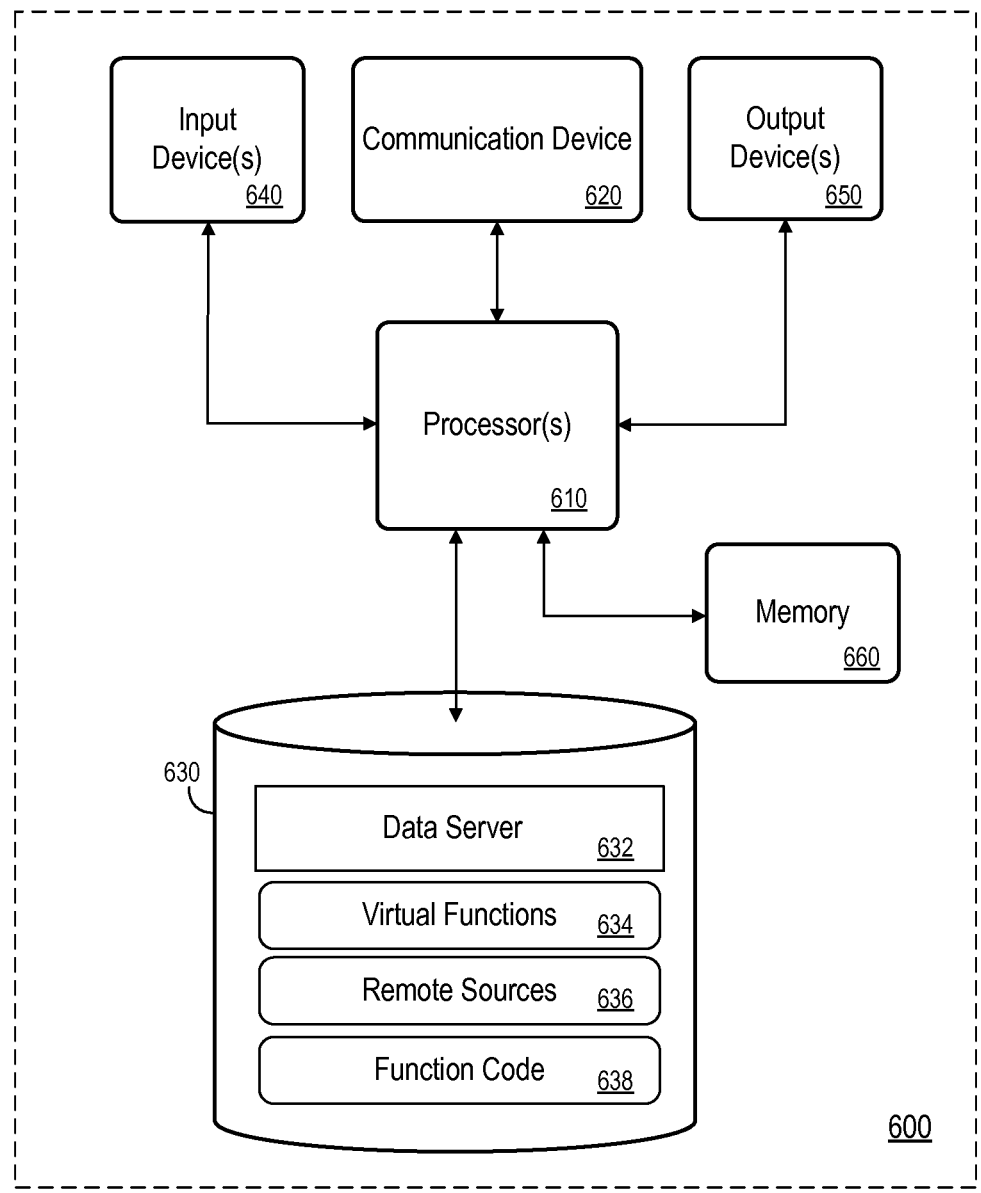
FIG. 6 is a block diagram of an apparatus according to some embodiments.

FIG. 6 is a block diagram of apparatus 600 according to some embodiments. Apparatus 600 may comprise a general-purpose computing apparatus and may execute program code to perform any of the functions described herein. Apparatus 600 may comprise an implementation of data server 110 in some embodiments. Apparatus 600 may include other unshown elements according to some embodiments.

Apparatus 600 includes one or more processors 610 operatively coupled to communication device 620, data storage device 630, one or more input devices 640, one or more output devices 650 and memory 660. Communication device 620 may facilitate communication with external devices, such as a reporting client, or a data storage device. Input device(s) 640 may comprise, for example, a keyboard, a keypad, a mouse or other pointing device, a microphone, knob or a switch, an infra-red (IR) port, a docking station, and/or a touch screen. Input device(s) 640 may be used, for example, to enter information into apparatus 600. Output device(s) 650 may comprise, for example, a display (e.g., a display screen) a speaker, and/or a printer.

Data storage device 630 may comprise any appropriate persistent storage device, including combinations of magnetic storage devices (e.g., magnetic tape, hard disk drives and flash memory), optical storage devices, Read Only Memory (ROM) devices, etc., while memory 660 may comprise Random Access Memory (RAM).

Data server 632 may comprise program code executed by processor 610 to cause apparatus 600 to perform any one or more of the processes described herein. Embodiments are not limited to execution of these processes by a single apparatus. Data storage device 630 also stores data of a data repository used in conjunction with some embodiments, including but not limited to virtual functions 634, remote sources 636 and function code 638. As described above, database data (either cached or a full database) may be stored in volatile memory such as memory 660. Data storage device 630 may also store data and other program code for providing additional functionality and/or which are necessary for operation of apparatus 600, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing processor-executable program code; and
a processor to execute the processor-executable program code in order to cause the computing system to:
define a remote data source;
define a virtual function, the virtual function specifying a return structured data format and a location of an unstructured file stored in the remote data source;
receive a structured language query, where the virtual function is a parameter of a FROM clause of the query; and
in response to the received query, retrieve the unstructured file from the remote data source, data of the file retrieved from the remote data source being returned in the return structured data format specified by the virtual function.

2. A system according to claim 1, wherein return of the data of the file in the specified return data format comprises a return of the data in columnar and compressed format.

3. A system according to claim 1, wherein the virtual function specifies executable job code and a data location in the remote data source, and
wherein, in response to the received query, the remote data source is instructed to execute the executable job code based on data in the data location.

4. A system according to claim 1, wherein the virtual function specifies executable code of a plurality of jobs and a sequence of the plurality of jobs, and
wherein, in response to the received query, the remote data source is instructed to execute the executable code of the plurality of jobs according to the sequence.

5. A system comprising:
a memory storing processor-executable program code; and
a processor to execute the processor-executable program code in order to cause the computing system to:
define a remote data source;
define a virtual function, the virtual function specifying executable job code, a return structured data format and an unstructured file data location in the remote data source;
receive a structured language query, where the virtual function is a parameter of a FROM clause of the query; and
in response to the received query, instruct the remote data source to execute the executable job code based on data in the specified unstructured file data location and return data including results of the execution in the return structured data format specified by the virtual function.

6. A system according to claim 5, wherein the returned data is in columnar and compressed format.

7. A system according to claim 5, wherein the virtual function specifies executable code of a plurality of jobs and a sequence of the plurality of jobs, and
wherein, in response to the received query, the remote data source is instructed to execute the executable code of the plurality of jobs according to the sequence.

8. A non-transitory computer-readable medium storing program code, the program code executable by a processor of a computing system to cause the computing system to:
define a remote data source;
define a virtual function, the virtual function specifying a return structured data format and a location of an unstructured file stored in the remote data source;
receive a structured language query, where the virtual function is a parameter of a FROM clause of the query; and
in response to the received query, retrieve the unstructured file from the remote data source, data of the file retrieved from the remote data source being returned in the return structured data format specified by the virtual function.

9. A medium according to claim 8, wherein return of the data of the file in the specified return data format comprises a return of the data in columnar and compressed format.

10. A medium according to claim 9, wherein the virtual function specifies executable job code and a data location in the remote data source, and wherein, in response to the received query, the remote data source is instructed to execute the executable job code based on data in the data location.

11. A medium according to claim 9, wherein the virtual function specifies executable code of a plurality of jobs and a sequence of the plurality of jobs, and wherein, in response to the received query, the remote data source is instructed to execute the executable code of the plurality of jobs according to the sequence.

* * * * *